DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 10, 1970

872 O.G. 358

T872,004
PHOTOGRAPHIC COATING COMPOSITIONS CONTAINING MERCAPTO COMPOUNDS

Ronald Verhow and Edwin B. Wyand, both % Kodak Park, Rochester, N.Y. 14650

Filed Oct. 9, 1969, Ser. No. 865,205
**Int. Cl. G03c *1/76***
U.S. Cl. 96—67
No Drawing. 12 Pages Specification

A photographic coating composition for protecting silver photographic images, particularly those formed by diffusion transfer which comprises an acidic film-forming polymer, such as an acidic vinyl monomer, a solvent for the polymer, and at least one material selected from the group of mercaptotetrazoles, and mercapto aromatic carboxylic acids, particularly in an amount of from 0.1 to 0.5 percent by weight of the solids content of the solution and mercapto aliphatic carboxylic acids such as 2-mercapto isobutyric acid, etc. in an amount of from 1 to 5 percent by weight of the solids content of said solution.